United States Patent [19]

Chana

[11] 4,445,602
[45] May 1, 1984

[54] GEAR SYNCHRONIZER FOR A POWER TRANSMISSION

[75] Inventor: Howard E. Chana, Troy, Mich.

[73] Assignee: General Motors Corporation, Detroit, Mich.

[21] Appl. No.: 323,415

[22] Filed: Nov. 20, 1981

[51] Int. Cl.³ ........................ F16D 13/28; F16H 3/38
[52] U.S. Cl. ..................................... 192/53 F; 74/339
[58] Field of Search ................ 192/53 F, 53 A, 53 C; 74/339

[56] References Cited

U.S. PATENT DOCUMENTS

| | | | |
|---|---|---|---|
| 2,932,373 | 4/1960 | Schmid | 192/53 A |
| 3,158,240 | 11/1964 | Harrington | 192/53 C |
| 3,272,291 | 9/1966 | Flinn | 192/53 F |
| 3,286,801 | 11/1965 | Wojcikowski | 192/53 F |
| 3,378,122 | 4/1968 | Funiciello | 192/53 C |
| 4,294,338 | 10/1981 | Simmons | 192/53 F |

FOREIGN PATENT DOCUMENTS 1385860 12/1964 France .............. 192/53 F
1102991 2/1968 United Kingdom .

Primary Examiner—Allan D. Herrmann
Assistant Examiner—Stephen B. Andrews
Attorney, Agent, or Firm—Donald F. Scherer

[57] ABSTRACT

A synchronizer for a power transmission has a split cone ring rotatable with a ratio gear and a split bearing ring rotatable with the synchronizer ring. During ratio change, the synchronizer ring transmits a normal force to the split cone ring which develops into axial and radial components. The normal component imposes a first frictional torque on the cone ring while the radial component causes contraction of the cone ring about the split bearing to create a second frictional torque acting on the cone ring. The contraction of the cone ring causes contraction of the bearing which frictionally engages a hub on the ratio gear and transmits a third frictional torque to the hub. The three torques are additive to cause the ratio gear to accelerate or decelerate so that speed synchronizing between the shift ring, synchronizer ring and ratio gear will occur.

3 Claims, 3 Drawing Figures

GEAR SYNCHRONIZER FOR A POWER TRANSMISSION

This invention relates to gear synchronizers and more particularly to gear synchronizers having increased synchronizing torque.

There have been many synchronizers which seek to increase the synchronizing torque for a given input force to provide for a more efficient shifting of power transmissions. These prior art devices have utilized a plurality of cone surfaces which result in an increased axial dimension in the synchronizer assembly. Other devices utilize spring members which wrap down during synchronization to increase the torque capacity.

The present invention utilizes the conventional single cone surface arrangement to provide increased synchronizing torque by permitting diametral contraction of the cone ring and a bearing member resulting in two additional friction contact surfaces. These additional friction contact surfaces increase the acceleration torque seen by the ratio gear for a given input force on the shift ring.

It is therefore an object of this invention to provide an improved gear synchronizer mechanism which will have an increased accelerating torque for a given shift force.

It is a further object of this invention to provide an improved gear ratio synchronizing mechanism wherein the synchronizer cone is deflectable in a diametral direction to provide the conventional torque transmission through the cone surface and also through a diametral surface which engages a deformable bearing which in turn also transmits a torque force to the accelerating gear member.

These and other objects and advantages of the present invention will be more apparent from the following specification and drawings in which.

Figure 1:
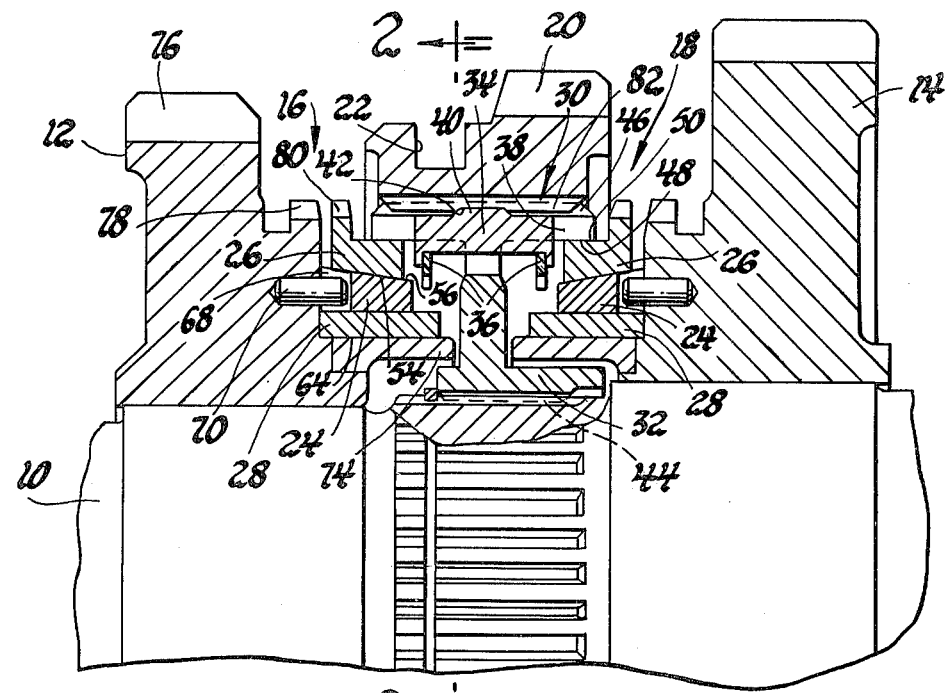
FIG. 1 is a cross-sectional elevational view of a portion of a power transmission utilized in the present invention.
Figure 3:
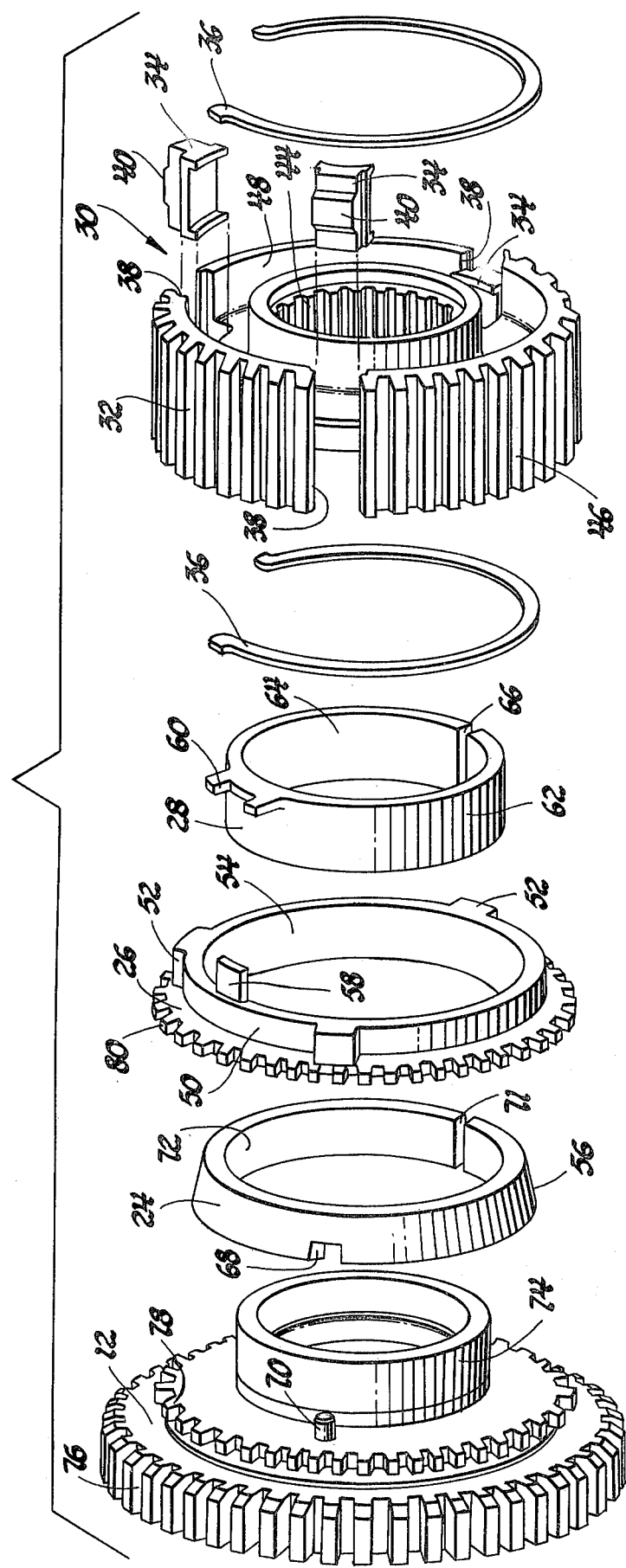
FIG. 3 is an exploded perspective view of one of the synchronizer assemblies shown in FIG. 1.

Referring to the drawings, wherein like characters represent the same or corresponding parts throughout the several views, there is seen in FIG. 1 a transmission shaft 10, on which are rotatably supported a pair of ratio gears 12 and 14. Disposed between the ratio gears 12 and 14 is a pair of synchronizer assemblies 16 and 18 which are operable to cause selective speed synchronization between shaft 10 and ratio gears 12 and 14, respectively. The synchronizer assemblies 16 and 18 are operated through a shift ring 20 which is connected by a yoke groove 22 to a conventional mechanical shift mechanism, not shown. The synchronizer 16 is shown in exploded perspective view in FIG. 3. The synchronizer 18 is substantially identical with the synchronizer 16 such that a detailed description of synchronizer 16 only is believed necessary. The synchronizer assembly 16 includes a split cone ring 24, a synchronizer ring 26 and a split bearing ring 28. The synchronizer assemblies 16 and 18 have a common component which is a hub assembly 30 which includes a hub 32, a plurality of strut keys 34 and a pair of retainer springs 36.

Figure 2:
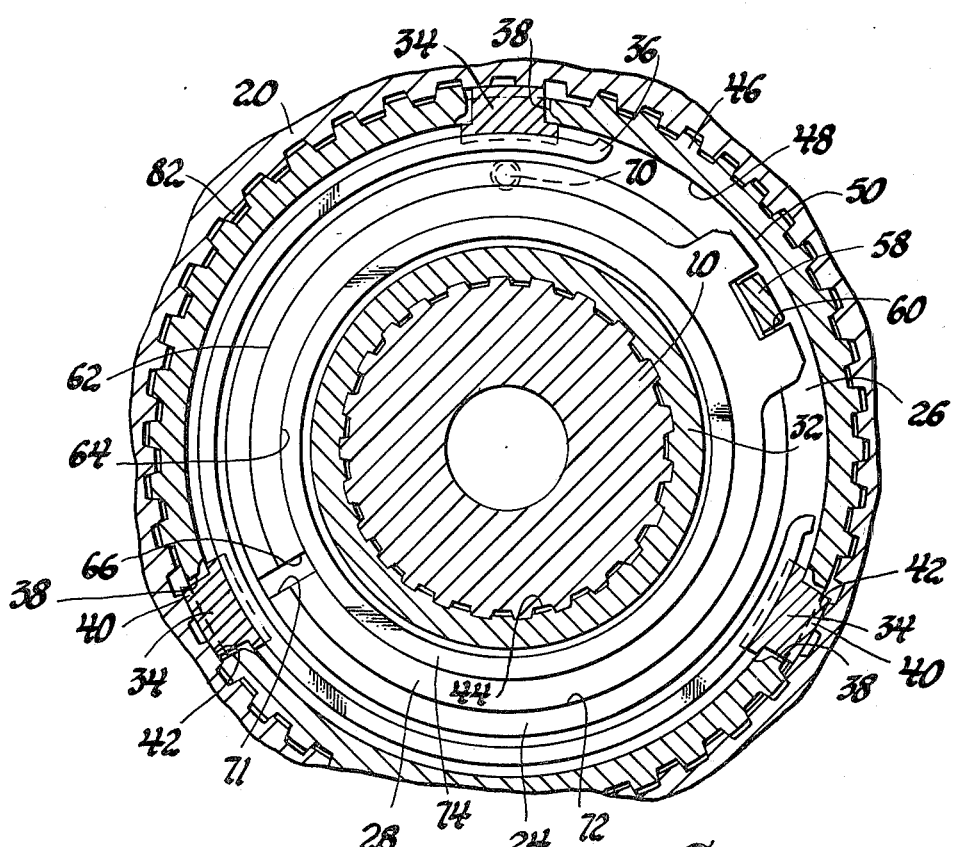
FIG. 2 is a cross-sectional view taken along line 2—2 in FIG. 1.

As seen in FIGS. 1 and 2, retainer springs 36 are compressed and inserted between the strut keys 34 such that upon release of the compression forces, the springs 36 will maintain the strut keys 34 in an outward attitude in respective slots 38 formed in the hub 32. The strut keys 34 each have a raised central surface 40 which engages a corresponding recess 42 in the shift ring 20. The hub 32 has an inner splined diameter 44 which engages the shaft 10, an outer splined diameter 46 which engages the shift ring 20 and a pair of surfaces 48 which are spaced from a pair of corresponding cylindrical surfaces 50 formed on the synchronizer ring 26.

The synchronizer ring 26 has a plurality of protuberances 52 which extend radially outward from the surface 50 and are engaged in the slots 38 formed in the hub 32. The inner surface 54 of synchronizer ring 26 is conical and has an included angle equal to the included angle of conical surface 56 formed on the split cone ring 24. The synchronizer ring 26 has an axial protuberance or drive tang 58 which engages in a drive slot 60 formed on the outer surface of split bearing ring 28. The drive tang 58 and drive slot 60 are at a radial position which provides clearance with the inner surface 48 of hub 32.

Because of the connection between slots 38 and protuberances 52 and drive tang 58 and drive slot 60, the hub 32 and synchronizer ring 26 will always rotate in unison. The split bearing ring 28, other than drive slot 60, has a cylindrical outer surface 62 and an inner cylindrical surface 64. These surfaces have an axial split 66 formed therein which is substantially diametrically opposite the drive slot 60.

The split cone ring 24 has formed therein a drive slot 68 which engages a drive pin 70 secured to the ratio gear 12. The split cone ring 24 has the outer conical surface 56, as previously mentioned, an inner cylindrical surface 72 which cooperates with the outer cylindrical surface 62 of split bearing ring 28, to provide a rotary bearing support structure and an axial split 71 substantially diametrically opposite slot 68. Because of the slot 68 and pin 70, the split cone ring will rotate in unison with the ratio gear 12.

The ratio gear 12 includes a cylindrical hub portion 74 which is disposed in rotary bearing relationship with the inner cylindrical surface 64 of the split bearing ring 28. The ratio gear 12 has a toothed outer diameter 76 adapted to mesh with other gear members in a well-known manner and a toothed surface 78 which is coaxial and alignable with a toothed surface 80 formed on the outer circumference of synchronizer ring 26. Both toothed surfaces 78 and 80 are engageable by a toothed surface 82 formed on the shift ring 20 which surface 82 is in continual engagement with the splined surface 46 formed on the hub 32.

When it is desirable to engage ratio gear 12 to shaft 10, the shift ring 20 is moved leftward by the operator, as viewed in FIG. 1. Initially, the strut keys 34 abut the radial surface of synchronizer ring 26 and due to the detent mechanism formed by the surface 40 and recess 42, the synchronizer ring 26 is urged leftward. Leftward movement of the synchronizer ring 26 results in abutment between the conical surface 54 and conical surface 56. The lateral force exerted on the synchronizer ring 26 when transmitted to split cone ring 24 has a radial and normal force component. The normal component results in a frictional driving connection between the conical surfaces while the radial force will cause radial contraction of the split cone ring 24.

The frictional drive force results in an accelerating torque being transmitted to the split cone ring 24 which is proportional to the input force, the coefficient of friction between the members and the average radius of the conical contact surfaces. As a result of the contraction of split cone ring 24, a frictional drive connection between the split bearing ring 28 and the split cone ring 24 also occurs since the split bearing ring is rotatable with the hub 32. The torque transmitted between the split bearing and the split cone ring 24 is proportional to the coefficient of friction therebetween, the input force and the outer radius of the split bearing ring.

The radial force applied also causes contraction of the split bearing ring 28 which, upon contraction assumes a frictional drive relationship with the hub 74 of gear 12. The frictional torque created at this drive connection is proportional to the coefficient of friction therebetween, the input force and the inner radius of the split bearing ring 28. As long as there is a speed differential between the shift ring 20 and the ratio gear 12, these acceleration torques will continue. As is well-known, the ratio gear 12 will very rapidly accelerate to the speed of shaft 10 and shift ring 20 such that shifting can be completed. When synchronization is completed, the gear teeth 82 pass through the gear teeth 80 into mesh with the teeth 78 so that a positive drive connection from shaft 10 to ratio gear 12 is accomplished.

The ratio gear 14 can be connected to the shaft 10 through the action of synchronizer 18 in the manner described above for synchronizer 16. Therefore, a detailed description of the operation of synchronizer 18 is not considered necessary and the corresponding parts have been given the same numerical designation as the components described for synchronizer 16.

From the above description, it will be seen that the single lateral apply force results in three separate frictional torque driving connections between the synchronizer assembly 16 and the ratio gear 12. Thus, it will be apparent that acceleration of the ratio gear 12 will be more rapid for a given input force, or as stated another way, less lateral force or shift force will be required to provide acceleration equal to that found in a conventional synchronizer which has a single frictional torque surface. Therefore, a lighter shift linkage can be utilized if desired or less mechanical advantage can be utilized between the operator and the shift ring 20.

Obviously, many modifications and variations of the present invention are possible in light of the above teaching. It is therefore to be understood that within the scope of the appended claims, the invention may be practiced otherwise than as specifically described.

The embodiments of the invention in which an exclusive property or privilege is claimed are defined as follows:

1. A synchronizer and gear assembly comprising; a gear member including a drive pin and a hub portion; a split cone ring having a drive slot engaging said drive pin to effect rotation with said gear member and also having an outer conical surface, an inner cylindrical surface, and an axially extending slot permitting radial contraction of the split cone ring when a radial force is applied to the conical surface; a synchronizer ring having a conical surface disposed for controlled abutment with said split cone ring conical surface and an axial drive tang; a split bearing ring rotatably supporting said split cone ring, journalled on said hub portion and having a drive slot engaged with said axial drive tang to effect rotation with said synchronizer ring, and also including an axial split permitting radial contraction in the presence of a radial force imposed by contraction of said split cone ring; and operator controlled shift means for moving said synchronizer ring axially relative to said split cone ring and said split bearing ring for providing controlled abutment of said conical surfaces for transmitting a synchronizing force to said split cone ring for inducing an accelerating synchronizing torque at said gear member, said force being communicated in a normal and radial direction to said split cone ring and a radial direction to said split bearing ring to impose accelerating synchronizing torques on said gear member at the abutment of said synchronizer ring and said split cone ring and at the bearing surfaces between said split cone ring and said split bearing ring and between said split bearing ring and said hub portion whereby the synchronizing torque is increased for a given synchronizer force.

2. A synchronizer and gear assembly comprising; a gear member including a hub portion; a split cone ring rotatable with said gear member and having an outer conical surface, an inner cylindrical surface, and an axially extending slot permitting radial contraction of the split cone ring when a radial force is applied to the conical surface; a synchronizer ring having a conical surface disposed for controlled abutment with said split cone ring conical surface; a split bearing ring rotatably supporting said split cone ring, journalled on said hub portion and being rotatable with said synchronizer ring, including an axial split permitting radial contraction in the presence of a radial force imposed by contraction of said split cone ring; and means for moving said synchronizer ring axially relative to said split cone ring and said split bearing ring for providing controlled abutment of said conical surfaces for transmitting a synchronizing radial force to said split cone ring for inducing an accelerating synchronizing torque at said gear member, said radial force being communicated to said split cone ring and said split bearing ring to impose accelerating synchronizing torques on said gear member at the abutment of said synchronizer ring and said split cone ring and at the bearing surfaces between said split cone ring and said split bearing ring and between said split bearing ring and said hub portion whereby the synchronizing torque is increased for a given synchronizer force.

3. A synchronizer and gear assembly comprising; a gear member having drive connecting means and a hub portion; a split cone ring having an outer conical surface, an inner cylindrical surface, drive connecting means for driving connection with said gear member and an axially extending slot permitting radial contraction of the split cone ring when a force is applied to the conical surface; a synchronizer ring having a conical surface disposed for controlled abutment with said split cone ring conical surface; a split bearing ring rotatably journalled on said hub portion having a rotary drive connection with said synchronizer ring, an axial split permitting radial contraction of said split bearing ring in the presence of a radial force and having an outer cylindrical surface defining a support for said split cone ring; and means for moving said synchronizer ring axially for providing controlled abutment of said conical surfaces for transmitting a synchronizing force to said split cone ring for accelerating said gear member, said force being communicated to said split cone ring and said split bearing ring to impose accelerating synchronizing torques to said gear member at the abutment of said synchronizer ring and said split cone ring and at the surfaces between said split cone ring and said split bearing ring and between said split bearing ring and said hub portion whereby the synchronizing torque is increased for a given synchronizer force.

* * * * *